United States Patent [19]

Miki et al.

[11] Patent Number: 5,071,471

[45] Date of Patent: Dec. 10, 1991

[54] METHOD OF AND APPARATUS FOR REMOVING NON-METALLIC INCLUSIONS FROM MOLTEN METAL

[75] Inventors: Yuji Miki; Hidenari Kitaoka; Shuji Takeuchi; Kenichi Sorimachi; Toshikazu Sakuraya, all of Chiba, Japan

[73] Assignee: Kawasaki Steel Corporation, Kobe, Japan

[21] Appl. No.: 581,688

[22] Filed: Sep. 13, 1990

[30] Foreign Application Priority Data

Sep. 22, 1989 [JP] Japan .................................. 1-245019

[51] Int. Cl.$^5$ ............................ C21C 5/52; H05B 5/12
[52] U.S. Cl. .................................... 75/10.14; 75/10.16
[58] Field of Search ............................ 75/10.14, 10.16

[56] References Cited

U.S. PATENT DOCUMENTS 2,256,901  9/1941  Horgard .............................. 75/10.16
3,827,877  8/1974  Pantke ................................ 75/10.16

Primary Examiner—Peter D. Rosenberg
Attorney, Agent, or Firm—Dvorak and Traub

[57] ABSTRACT

A method of removing non-metallic inclusions from a molten metal comprises the step of simultaneously applying both a horizontal rotation of the molten metal and heating of the molten metal by induction heating. After the simultaneous application of rotational force and heat, the induction heating may be stopped while the horizontal flow of the molten metal is maintained, so as to promote the separation of the particles of the inclusions. The method is carried out by using an apparatus which has a vessel which contains the molten metal, a rotary magnetic field generating device surrounding the vessel, and an induction heating device also surrounding the vessel. Each of the rotary magnetic field generating device and the induction heating device may be divided into a plurality of circumferential segments and arranged such that the segments of both devices are alternately disposed around the vessel.

4 Claims, 5 Drawing Sheets

METHOD OF AND APPARATUS FOR REMOVING NON-METALLIC INCLUSIONS FROM MOLTEN METAL

BACKGROUND OF THE INVENTION

1. Field of the Invention

The present invention relates to a method of and an apparatus for removing non-metallic inclusions and intermetallic compounds from a molten metal.

2. Description of the Prior Art

It is known that non-metallic inclusions and intermetallic compounds (generally referred to as "inclusions", hereinafter) in a molten metal causes defects in the final product produced from the metal. Various studies have been therefore made to develop techniques which enable an efficient removal of such inclusions. For instance, Japanese Patent Laid-Open Publication Nos. 55-107743 and 58-22317 disclose methods in which horizontal rotational flow is imparted to a molten steel so that non-metallic inclusions are concentrated to the central region due to centrifugation. Japanese Patent Laid-Open Publication No. 63-219536 discloses a method in which drifting dross in a molten zinc bath is maintained at a predetermined temperature which provides a required level of fluidity of the bath during centrifugal separation.

These known methods rely solely upon mechanical separation such as centrifugation and cannot effectively separate fine particles, although they can efficiently separate comparatively large particles of non-metallic inclusions and impurities.

A method disclosed in Japanese Patent Laid-Open Publication No. 61-103654, relies solely upon heating of molten metal, but cannot produce appreciable effect in excluding large particles of non-metallic inclusions, in particular mixing of slag which is generated in unsteady state of a melt-forming proces, although this method is effective in preventing generation of non-metallic inclusions and removal of the small-sized non-metallic inclusions.

SUMMARY OF THE INVENTION

Accordingly, an object of the present invention is to provide a method of and apparatus for efficiently separating, from a molten metal, non-metallic inclusions and intermetallic compounds of various particle sizes.

To this end, according to one aspect of the present invention, there is provided a method of removing non-metallic inclusions from a molten metal, comprising: simultaneously effecting both a horizontal rotation of the molten metal and heating of the molten metal by induction heating.

According to another aspect of the present invention, there is provided an apparatus for removing non-metallic inclusions from a molten metal, comprising: a vessel for containing the molten metal; a rotary magnetic field generating device surrounding the vessel; and an induction heating device also surrounding the vessel.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
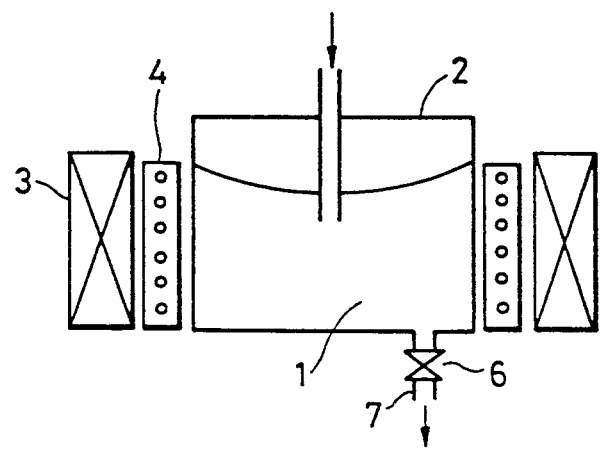
FIGS. 1 and 2 are schematic illustrations of an embodiment of the apparatus for separating and removing non-metallic inclusions in accordance with the present invention.

Referring to FIG. 1, according to the present invention, a horizontal rotation is imparted to a molten metal 1 contained in a vessel 2 of an apparatus for removing non-metallic inclusions, by means such as a rotary magnetic field generating device 3, so that comparatively large particles such as of non-metallic inclusions and intermetallic compounds having smaller values of specific gravity than the molten metal are concentrated in the central region, whereas large particles having greater values of specific gravity are separated to the peripheral region of the rotational flow. Subsequently, the temperature of the molten metal is raised by a heater 4 so that the solubility of intermetallic compounds is enhanced whereby to dissolve even those small particles which had been precipitated at the lower temperature.

In most cases, the rate of separation of small non-metallic inclusions and intermetallic compounds is ruled by the rate of coarsening of the particles due to aggregation and coagulation. The greater the agitating power, the higher the coarsening rate. When a horizontal rotational magnetic field and high-frequency heating ar simultaneously effected in the same vessel, horizontal rotation and vertical agitation take place simultaneously so as to provide an extremely large agitating power, thus remarkably promoting the separation. In particular, when slag floats on the upper surface of the molten metal, it is impossible to promote the contact between the molten metal and the slag by the horizontal rotation alone, so that the efficiency of absorption of non-metallic inclusions by the slag is extremely low. According to the present invention, since horizontal rotation and induction heating are effected simultaneously, the molten metal is sufficiently mixed with the slag which tends to float on the metal, whereby a high refining performance can be obtained.

Figure 5:
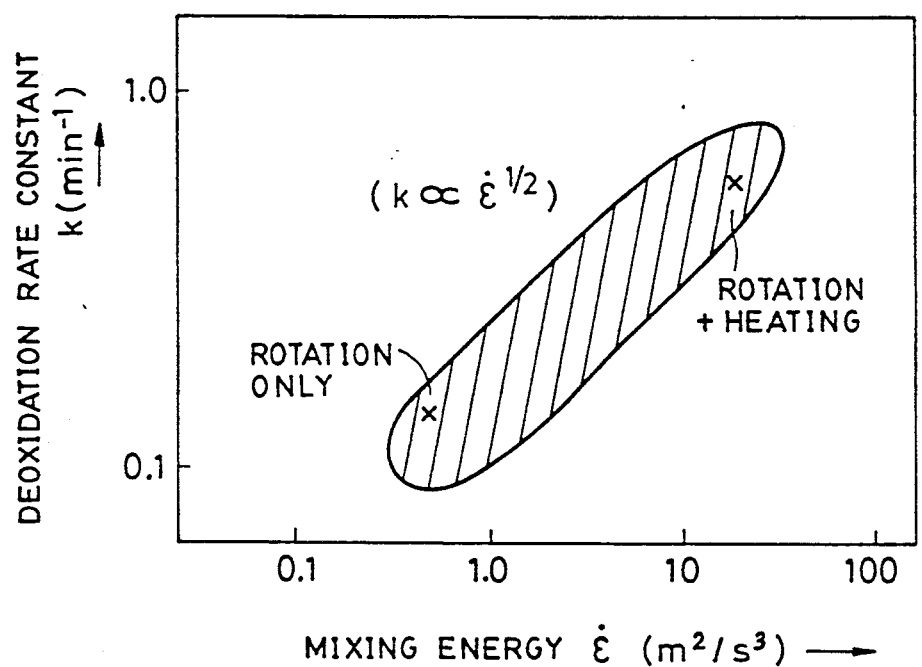
FIG. 5 is a graph showing the relationship between mixing energy and deoxidation rate constant.

In order to give a theoretical support to this remarkable feature of the invention, the inventors conducted a fluid dynamical analysis to compute mixing energy $\epsilon$ which also is referred to as energy density dissipation rate. It has been found that mixing energy is a factor which significantly affects the separation and floating of inclusions. It is therefore a key for obtaining a higher rate of separation of inclusions, to increase the value of the mixing energy. When neither the rotation nor heating is applied, the mixing energy $\epsilon$ is calculated to be 0.001 $m^2/s^3$ as a mean and, when rotational flow of 80 rpm is imparted, the mixing energy $\epsilon$ is calculated to be 0.3 $m^2/s^3$. In contrast, when both the rotational flow of 60 rpm and the induction heating with 800 KVA power are applied simultaneously, the mixing energy $\epsilon$ is as large as 20 m²/s³. It is thus possible to attain an agitating power by the simultaneous use of rotation and induction heating which compares favorably with that of bottom-blow converter. From the results of the computations shown above, as well as from FIG. 5 which shows the relationship between mixing energy and deoxidation rate constant k, it is understood that the method of the present invention provides a very large deoxidation effect. In FIG. 5, the hatched area shows the range of fluctuation of the respective values.

According to the present invention, it is possible to stop the induction heating while maintaining horizontal flow, after the simultaneous application of the horizontal flow and the induction heating. In such a case, the particle size progressively becomes greater due to coarsening caused by aggregation of the particles of inclusions, thus enabling an efficient removal of the inclusions. The method of the present invention can be used also for various refining processes such as dephosphorization and desulfurization.

In the method of the present invention, agitation which can input a high energy, and heating are effected simultaneously. It is therefore possible to add the required alloy components with a high yield.

FIG. 1 shows an apparatus which can simultaneously impart horizontal rotation and induction heating simultaneously. This apparatus has a rotary magnetic field generating device 3 and an induction heating device 4 arranged to surround a vessel 2.

Figure 2:
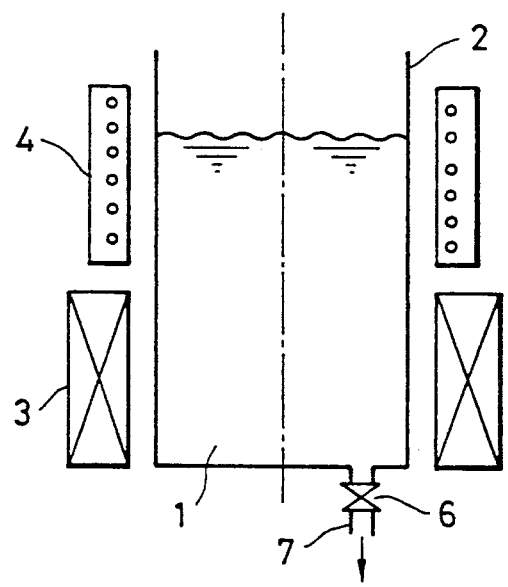
Figure 3A:
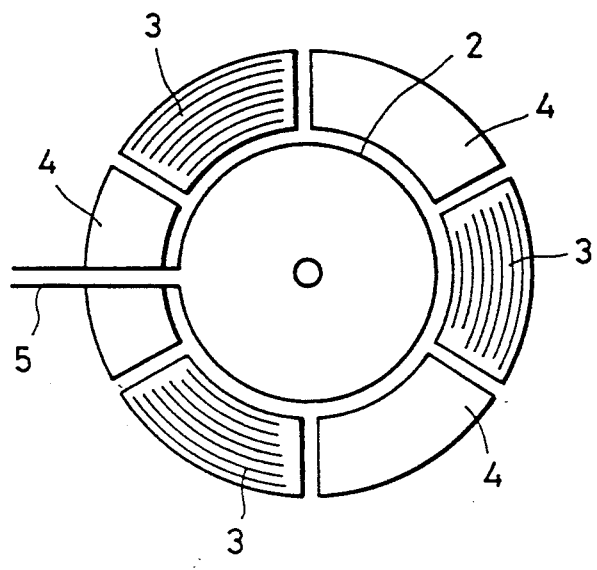
FIGS. 3(a) and 3(b) are a plan view and a side elevational view of an arrangement in which a rotary magnetic field generating device and an induction heating device are alternately disposed.

An arrangement may be such that the induction heating device 4 is placed above the rotary magnetic field generating device 3 as shown in FIG. 2. It is also possible to arrange the rotary magnetic field generating device 3 above the induction heating device 4. In order to attain a high agitation effect, it is preferred that both the rotary magnetic field generating device 3 and the induction heating device 4 be divided into segments and arranged such that the segments of the rotary magnetic field generating device 3 and the segments of the induction heating device 4 be alternately disposed around the vessel 2, as shown in FIG. 3(a).

Numeral 5 denotes a dross discharge pipe, 6 denotes a valve and 7 denotes a nozzle.

EXAMPLE 1

An example of the method of the invention, applied to separation of Fe-Al intermetallic compound from a Zn plating bath, will be described hereinunder.

Figure 3B:
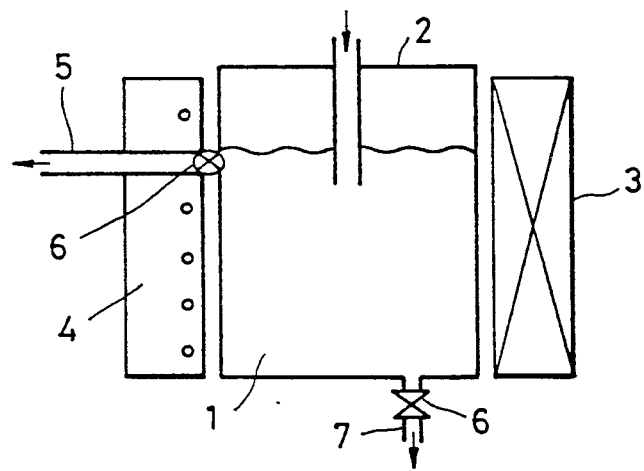

Molten zinc was continuously collected from a pot of a continuous hot-dip plating system for continuously plating a steel sheet. The extracted zinc was made to pass through the apparatus shown in FIG. 3 for separation and removal of impurities, and the cleaned molten zinc was discharged from a nozzle provided on the bottom of the vessel. The cleaned molten zinc was returned to the pot and used for the continuous hot-dip plating. An examination was conducted to investigate the rate of generation of the plating defect.

The capacity of the zinc pot was about 50 ton. The apparatus shown in FIG. 3 was operated at a process speed of 2 ton/min. The speed of horizontal rotation of molten zinc was 70 to 80 rpm, while the heating was performed by a high-frequency heating means at a rate of 40 KVA. The apparatus was operated cyclically such that the operation was stopped after each 10-minute operation for allowing the separated dross to be discharged outside through the dross discharge pipe.

Figure 4:
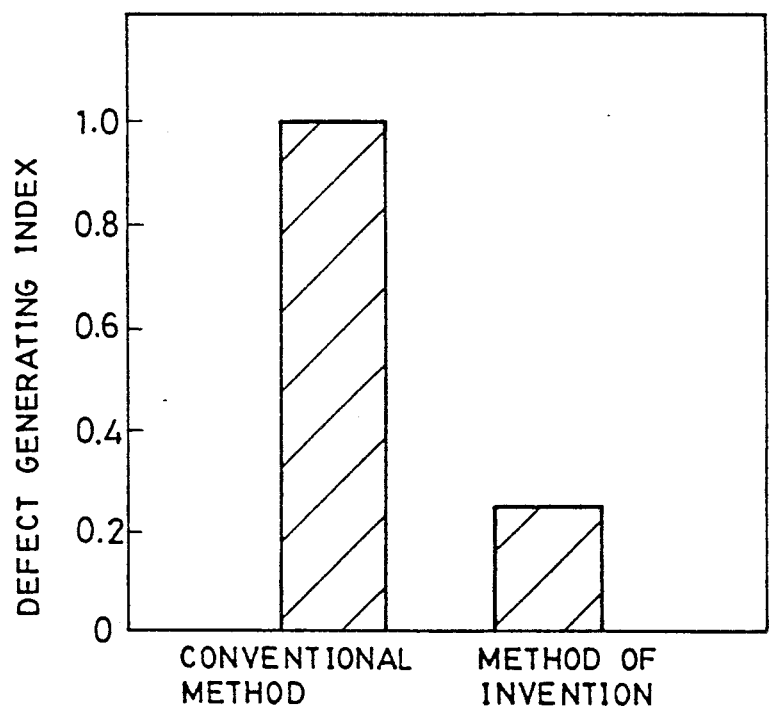
FIG. 4 is a characteristic chart showing an index of rate of generation of defects in the product in Example 1.

FIG. 4 shows the rate of generation of plating defects caused by presence of dross as observed when the zinc was treated in accordance with the process of the present invention, in comparison with the plating defect generating rate as observed when the process of the invention was not used. It will be seen that the rate of generation of plating defects is much smaller in the case where the molten zinc is treated by the process of the invention than in the case where the invention was not used. This clearly shows that the rate of removal of dross is remarkably improved by the process of the present invention because the rate of generation of plating defect is significantly reduced.

EXAMPLE 2

5 tons of aluminum killed steel was charged into the vessel of an apparatus of the type shown in FIG. 2 having upper induction heating device and lower rotary magnetic field generating device. A rotary magnetic field (central magnetic flux 350 Gauss) and heat by induction heating (300 KVA) were simultaneously applied to the steel for 5 hours. Then, the induction heating was stopped while the horizontal rotation was continued for an additional 3 minutes to allow for separation of coarsened inclusions.

For the purpose of comparison, tests were also conducted in which 10-minute magnetic agitation and 10-minute induction heating were applied separately.

Figure 6:
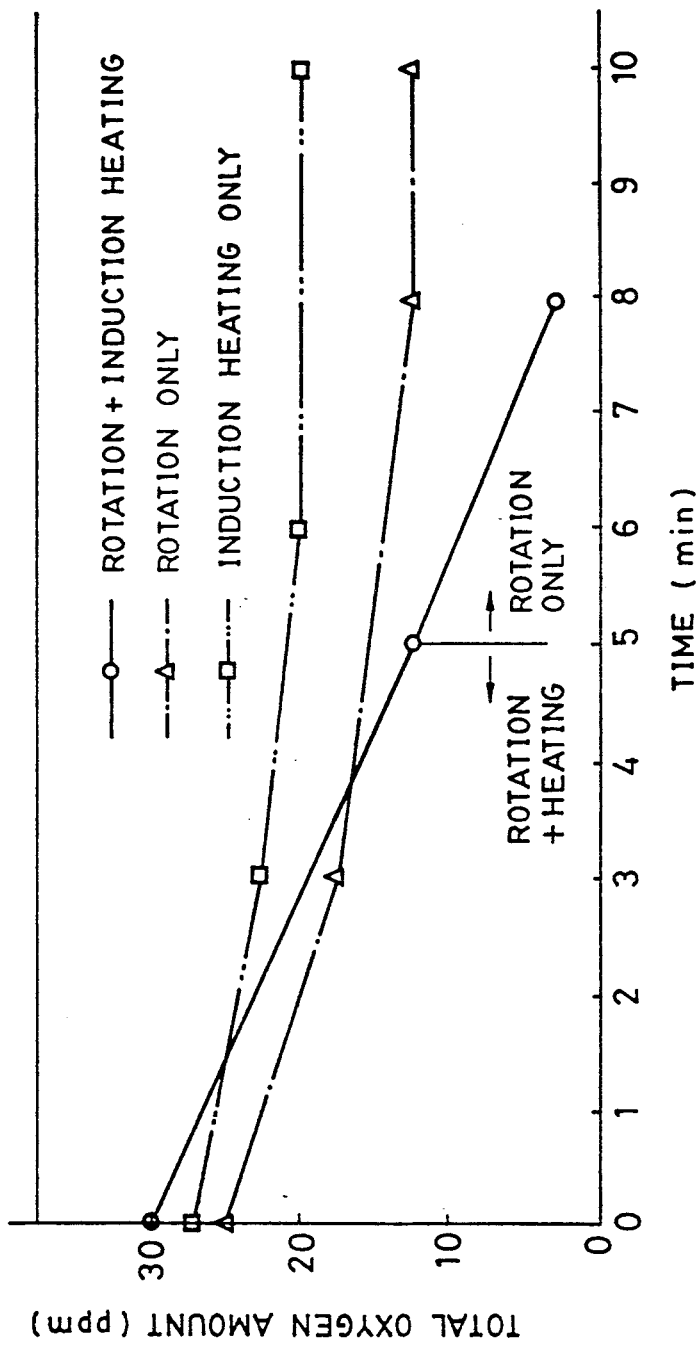
FIG. 6 is a graph showing the relationship between total oxygen amount and time.

The steels that were subjected to these tests were examined for changes in the total oxygen content. The results of the examination are shown in FIG. 6. It will be seen that the total oxygen amount can be reduced to 3 ppm, or lower, by the method of the present invention. Thus, the present invention makes it possible to conduct melt-forming process with a high degree of purity.

As will be understood from the foregoing description, according to the present invention, it is possible to efficiently separate and remove non-metallic inclusions and intermetallic compounds of various particle sizes from the molten metal. Furthermore, rate of generation of defects in steel sheets caused by presence of non-metallic inclusions, as well a rate of generation of plating defects due to presence of intermetallic compounds, i.e., dross, in the plating bath. can be reduced remarkably, thus ensuring high quality of the resulting product.

What is claimed is:

1. A method of removing non-metallic inclusions from a molten steel, comprising the steps of:
   (a) continuously flowing a molten metal from a metal melting vessel to a main vessel;
   (b) imparting, during the continuous flow of the molten metal, a horizontal rotation to the molten metal in said main vessel by means of a rotary magnetic field generating means provided on said main vessel;
   (c) heating, during the continuous flow of the molten metal and the horizontal rotation of said molten metal, said molten metal in said main vessel by means of an induction heating means provided on said main vessel;
   (d) thus causing the non-metallic inclusions to be separated from and to float on said molten metal by the effects of the horizontal rotation and heating of said molten metal; and
   (e) removing the separated floating non-metallic inclusions.

2. A method of removing non-metallic inclusions according to claim 1, including the step of stopping the induction heating while maintaining the horizontal flow of said molten metal so as to promote the separation of the particles of said inclusions.

3. An apparatus for removing non-metallic inclusions from a molten metal, comprising: a rotary magnetic field generating means arranged around a vessel containing a molten metal; an induction heating means arranged around said vessel; and means for removing the non-metallic inclusions separated from and floating on said molten metal.

4. An apparatus for removing non-metallic inclusions according to claim 3, wherein said rotary magnetic field generating means and said induction heating means is divided into a plurality of circumferential segments, and said rotary magnetic field generating means and said induction heating means are arranged such that the segments thereof are alternately disposed around said vessel.

* * * * *